Dec. 31, 1968    H. W. ALEXANDER    3,418,920
ROTARY BUN GRILL

Filed April 25, 1967    Sheet 1 of 2

INVENTOR
HARRY W. ALEXANDER

BY Lawrence R. Brown
ATTORNEY

*INVENTOR*
HARRY W. ALEXANDER

BY Laurence R. Brown

*ATTORNEY*

United States Patent Office 3,418,920
Patented Dec. 31, 1968

3,418,920
ROTARY BUN GRILL
Harry W. Alexander, Box 256, Rte. 1,
Leesburg, Va. 22075
Filed Apr. 25, 1967, Ser. No. 633,543
7 Claims. (Cl. 99—386)

ABSTRACT OF THE DISCLOSURE

A grill is provided for toasting buns comprising a fixed heater about which a rotating drum revolves to provide a heated surface. Buns sliced to present a flat face are clamped against flat surfaces on the polysided generally cylindrical drum by means of flat webbed paddles pivoted in and out by a camming system. The paddles are cammed for opening and closing over substantially a 90° revolution to thereby provide a substantially horizontal surface upon which the buns may be manually placed to rest by force of gravity and a substantially vertical surface which permits the buns to slide off by force of gravity at the end of a timed rotation in contact with the heated surface to provide the proper degree of toasting or grilling.

---

This invention relates to grills and toasters and more particularly it relates to automatic commercial grills adapted to toast buns which are used for hamburgers.

While automatic or semi-automatic toasters and grills of commercial quality are available for toasting uniforms slices of bread, the toasting of a bun has provided many problems so that satisfactory automatic grilling equipment of rugged long life and commercial quality have not heretofore been available. For example, buns may be of variable thicknesses, and may not be sliced exactly in half. Also it may be desirable to toast the bun only on the sliced side, whereas most bread slice toasters toast both sides.

Therefore it is an object of this invention to provide improved automatic commercial grills which will satisfactorily toast buns on the sliced face.

In accordance with the invention therefore, a rotary grill is provided having a set of pivoted mesh paddles which move into and out of a generally parallel relationship with the outer heated surface of a polysided drum to thereby clamp the bun face against the heated surface for grilling with just enough force to cause good surface contact without significantly deforming the bun.

Figure 1:
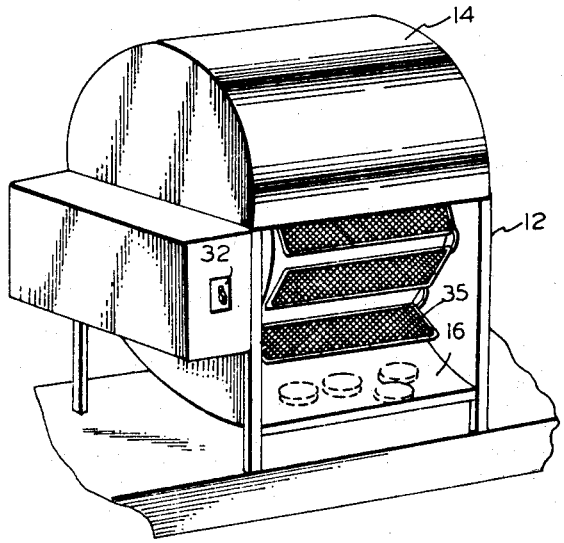
Figure 3:
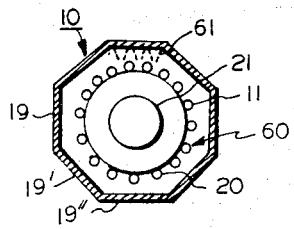
Figure 2:
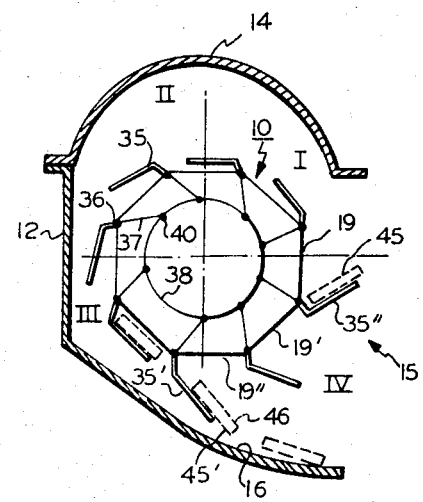
Figure 4:
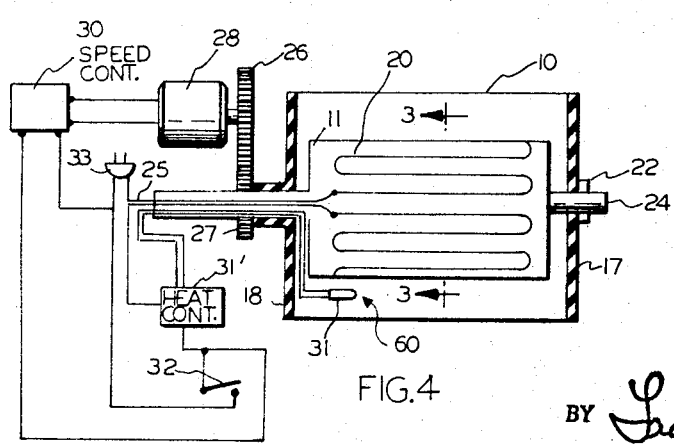
Figure 5:
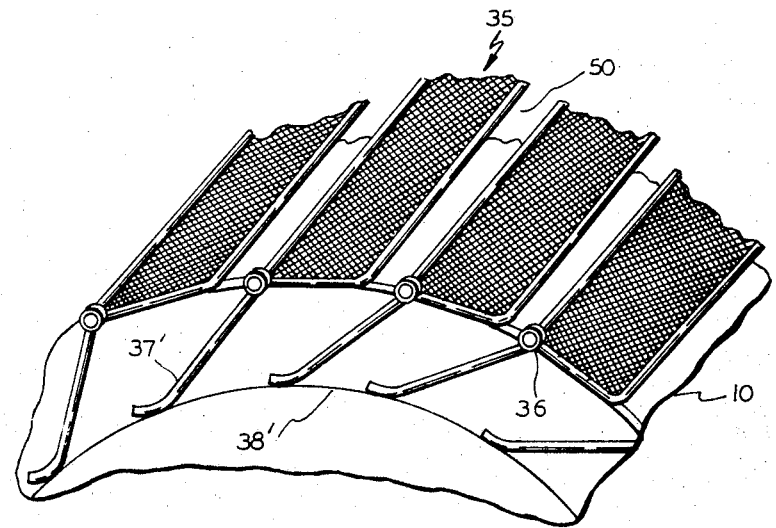
Figure 6:
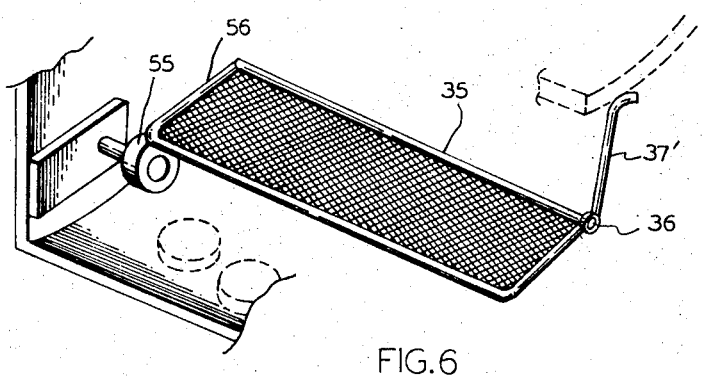
Figure 7:
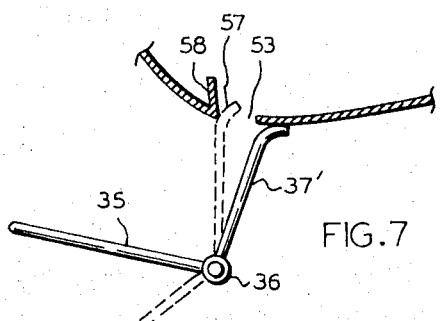

Other features, objects and advantages of the invention together with a detailed description of a preferred embodiment will be found in the following specification, which makes reference to the accompanying drawing, wherein:

FIGURE 1 is a front view in perspective of a rotary bun grill constructed in accordance with this invention, FIGURE 2 is a side view section sketch illustrating operation of the rotary drum and cammed paddles as provided by the invention, FIGURE 3 is a side view section showing the interior of the rotary drum as seen from lines 3—3 in FIGURE 4, FIGURE 4 is a front view sketch of the rotary drum system, partly in section showing the working relationship of various elements, and FIGURES 5 to 7 are broken away segmental views of a preferred camming arrangement for the paddles.

In the drawing similar reference characters are used in the various views to expedite comparison. Basically the grill comprises a substantially cylindrical polysided drum 10 rotatable about a central stationary heater assembly 11. The grill assembly has an outer protective housing 12 and hood 14 defining a front access window 15, at the bottom of which is a delivery chute 16.

The rotary drum 10 is insulated at each end cap 17, 18 to provide for almost the entire heat dissipation from heater element 20 through the flat planar surface sections 19. The interior of the heater mount may be provided with a reflector or insulating cylindrical stuffing 21 for the same purpose.

The rotary drum 10 is journalled by bearings 22 on a shaft 24, which is affixed for support in the housing by suitable means not shown. The shaft 24 may comprise a hollow pipe permitting wires 25 to pass through to heater element 20. A gear train 26, 27 attached to motor 28 provides driving power to rotate the drum 10, and may be supplied by variable speed control 30 to permit selection of a predetermined period of drum rotation. A heat thermostat element 31 is provided with heat control switch 31' for maintaining a constant known heat condition on the surface planar sections 19 of the rotary drum 10 as a result of sensing the temperature of air space 60. The entire system is therefore very simple, reliable and rugged and can be controlled from off-on switch 32 from a conventional power source coupled to plug 33.

The only movable parts in addition to the drum 10 drive linkage comprise a set of pivoted planar mesh paddles 35 pivoted about a pivot axis 36 with an extending cam rider 37 sliding about a contoured cam surface 38 as seen from the schematic representation of FIGURE 2. The cam rider can for example be a rod bent into the surface of the drawing at the terminal rider position 40 to ride in a confined cam groove 38. Other methods of camming may be substituted as desired to produce proper action of the paddles 35 as hereinafter described.

Assume the drum 10 is rotating counterclockwise as shown in the views of FIGURES 2 and 5. Then substantially over a 90° movement as in quadrant IV of FIGURE 2, which appears in window 15, provision is made to insert and discharge sliced buns 45 having a flat face 46 held flat against the planar surfaces 19 of the drum 10 by the paddles when pivoted into heating position over quadrants I, II and III. The flat mesh surfaces of paddles 35 thus ride in a position substantially parallel with the corresponding flat surface sections 19 of the drum except in quadrant IV. This serves to clamp the faces 46 of buns 45 against surface sections 19 with just enough pressure for grilling properly by transfer of heat from the drum 10 but not with enough pressure to deform or flatten the buns 45.

In quadrant IV however the cam surface varies so that the paddle 35' is moved to a substantially vertical position letting bun 45' slide off by force of gravity into chute 16. Then as the rotation continues to move position, the paddle 35' is substantially horizontal to permit buns 45 to be placed in position manually for automatic grilling over the rotation cycle. The paddles may be wide enough to place four buns side by side, and about five inches wide by seventeen inches long. The drum may typically have twelve planar surfaces 19 for receiving the paddles about a mean drum diameter of nineteen inches. This provides at a revolution speed of seventy seconds a reasonable capacity of about forty buns per minute with a single simple reliable grill constructed in the manner herein described.

As seen in FIGURES 5 to 7, the paddles 35 are of a mesh construction affixed to an outer frame rod arrangement 50 from which extends a cam arm 37' riding on stationary cam surface 38'. A gap 53 in the cam surface permits the paddle to drop in position to discharge the rolls, as modified by action of stop member 55, which the end 56 of the paddle 35 strikes. The curved cam arm surface 57 then engages the opposing ledge 58 of the cam gap 53 for eventual return from the discharge position to the open position (35" of FIGURE 2) for loading buns. This gap permits a generally smooth cam surface 38' throughout the remainder of travel.

It is noted that an air gap space 60 in FIGURE 3 is provided between the heater and relatively thin walled drum 10. Should this present a problem of retaining sufficient heat to assure proper limits by means of a simple thermostat 31 when the unit is designed for changes from unloaded to fully loaded conditions without overheating in the unloaded condition, heat sinks such as by aluminum ridges 61 can be affixed at appropriate intervals on the inside drum surfaces of the planar surfaces 19.

It is obvious that heats, speeds, and capacities may be varied to suit the requirements of particular installations, and other modifications may be made without departing from the spirit or scope of this invention. Those features of novelty believed descriptive of the nature of the invention are defined with particularly in the appended claims.

What is claimed is:

1. A bun grill and toaster device comprising in combination, a heated surface movable past two stations and having a plurality of substantially planar sections, a clamping member with a substantially planar surface pivoted in and out of a substantially parallel position with said planar sections at a distance holding a sliced bun half in substantially undistorted form between the planar sections and the planar surface with the sliced face in intimate face to face contact with the planar sections of said heated surface establishing a predetermined level to said movable surface for grilling said buns, cam means operable upon movement of said surface past a first of said stations to pivot each planar surface away from its corresponding said planar section in a substantially horizontal position to thereby receive buns lying by force of gravity on the planar surface, means operable with said cam upon further movement of the surface to pivot said planar section into said parallel position, means timing the movement in said parallel position to last a predetermined period before reaching the second station to thereby toast the bun a predetermined amount, and means operable with said cam for pivoting said planar surfaces to a substantially vertical position at said second station to release buns to slide off said planar surfaces by force of gravity.

2. A device as defined in claim 1, wherein said heated surface comprises a rotary polysided generally cylindrical shaped drum.

3. A device as defined in claim 1 including a stationary heater disposed adjacent said movable surface.

4. A heater grill comprising a rotary drum with a heated surface disposed to receive buns in face contact thereon over their entire face surface with a plurality of pivotable paddles disposed thereabout and carried with the drum, means to hold the paddles parallel with the heated surface at a spacing to contact the face of the buns with the heated surface, a stationary cam disposed to pivot said paddles in an open position substantially 90° away from the surface of the drum over substantially a 90° arc of drum movement starting at the bottom of the drum to thereby receive buns with the paddles open and removed from the heated drum surface, and to discharge them when the paddles are being opened.

5. A heater grill comprising a rotary substantially cylindrical drum with flat surface portions adapted to receive and grill the open face of a bun, means clamping buns selectively against the outer circumference of the drum to rotate over only a portion of the rotation of the drum and means heating the surface of the drum uniformly to toast said buns during said rotation.

6. A grill as defined in claim 5, wherein said heating means includes a stationary heater inserted within said drum, and means directing heat losses out substantially solely through said outer circumference.

7. A grill as defined in claim 5 wherein the clamping means comprises pivotable planar mesh paddles disposed in one position to be substantially parallel and in another position to be substantially normal to the outer circumference, and camming means pivoting the paddles to the two positions over a portion of the rotation cycle of said drum to thereby receive, toast and release the buns.

References Cited
UNITED STATES PATENTS

| | | | |
|---|---|---|---|
| 1,353,356 | 9/1920 | Lee | 198—210 XR |
| 1,471,275 | 10/1923 | Moneuse | 99—386 |
| 2,626,341 | 1/1953 | Bolling. | |
| 2,775,189 | 12/1956 | Scholl | 99—427 |
| 3,316,831 | 5/1967 | Kolano et al. | 99—443 XR |

BILLY J. WILHITE, *Primary Examiner.*

U.S. Cl. X.R.

99—427, 443; 198—210; 219—388